J. D. LANGDALE.
FISH TRAP.
APPLICATION FILED AUG. 31, 1915. RENEWED JUNE 21, 1918.

1,286,661.

Patented Dec. 3, 1918.
2 SHEETS—SHEET 1.

Witnesses
Frederick L. Fox.
E. Edmonston Jr.

Inventor
J. D. Langdale
By Victor J. Evans.
Attorney

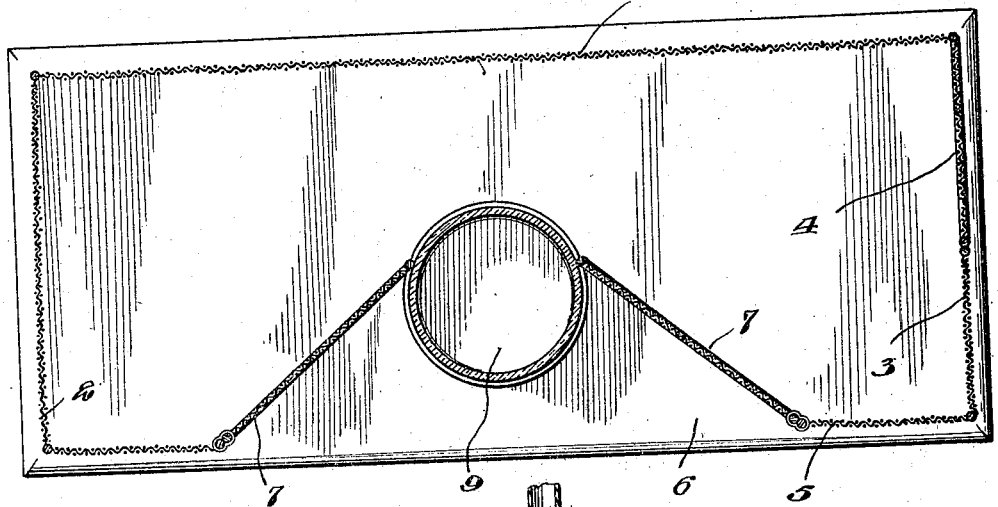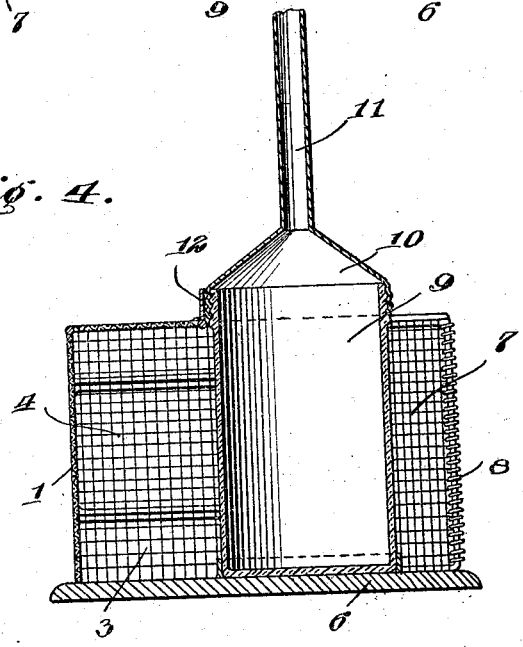

UNITED STATES PATENT OFFICE.

JEFFERSON D. LANGDALE, OF COUNCIL, GEORGIA.

FISH-TRAP.

1,286,661.　　Specification of Letters Patent.　　Patented Dec. 3, 1918.

Application filed August 31, 1915, Serial No. 48,255. Renewed June 21, 1918. Serial No. 241,293.

*To all whom it may concern:*

Be it known that I, JEFFERSON D. LANGDALE, a citizen of the United States, residing at Council, in the county of Clinch and State of Georgia, have invented new and useful Improvements in Fish-Traps, of which the following is a specification.

This invention relates to fish traps.

The principal object of the invention is to provide a simple and efficient trap which utilizes a transparent bait container for attracting the fish to the trap and for providing a device whereby the fish will in striking at the bait, automatically catch himself before his momentum can be overcome.

Further objects of the invention will appear as the following specific description is read in connection with the accompanying drawings which form a part of this application, and in which:—

Fig. 3 is a horizontal section.

Fig. 4 is a detail vertical section.

Figure 1:
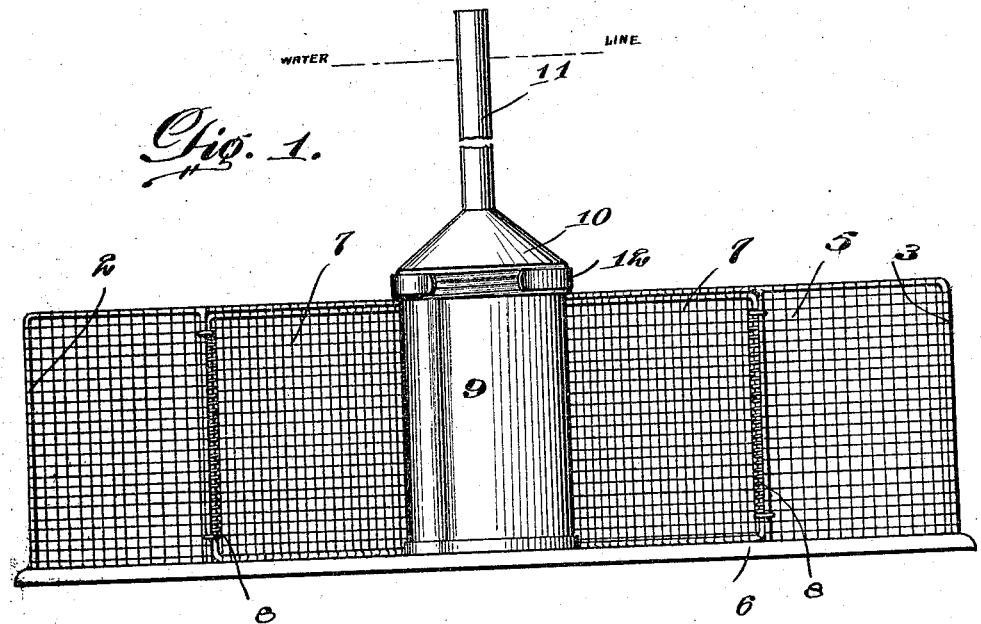
Figure 1 is a front elevation.
Figure 2:
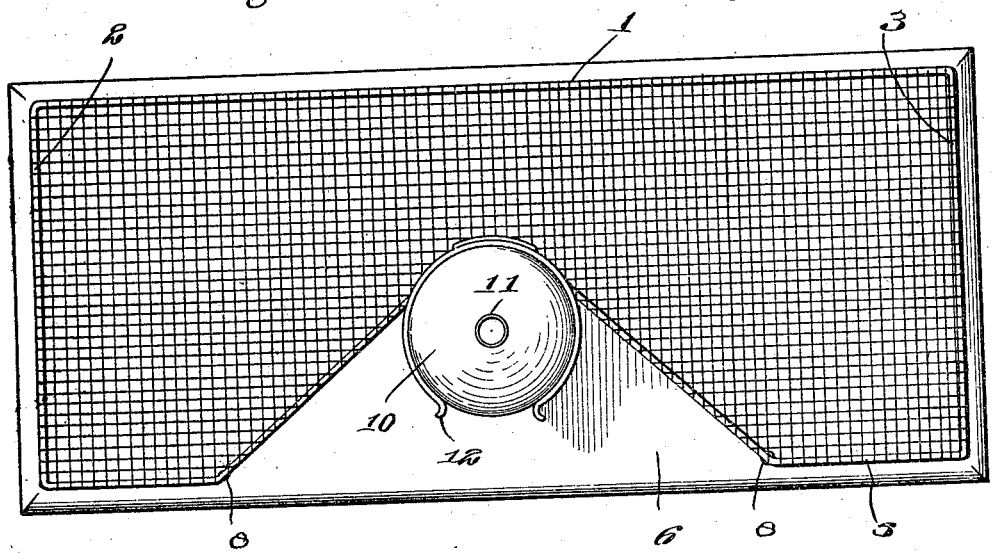
Fig. 2 is a top plan view.

In the specific embodiment of the invention, I provide a rectangular foraminous cage preferably constructed of woven wire, galvanized or otherwise suitably treated to prevent rust or corrosion and consisting of the back 1, ends 2 and 3, the latter provided with a door 4 for the removal of fish, a front 5 and a bottom 6, the latter member being preferably imperforate. The front and top are cut away as shown and hinged to the front at the edges of the opening thus formed are doors 7 normally actuated in one direction by suitable springs indicated at 8 and converging toward a common point, as shown.

The free edges of the doors abut, when in closed position, a bait container indicated at 9. This bait container is made of any suitable transparent material such as clear glass or the like and has no communication with the surrounding water. The upper end of the bait container is closed by a screw cap 10 of conical form and which has projecting from its apex a vent tube 11 adapted to extend above the surface of the water so as to give sufficient air to the bait inside of the container and to prevent the container from filling with water. The container is held removably in place against the bottom and in position to form an abutment for the free end of the doors by a spring clamp 12 which is secured to the top 62.

In use, the cage is submerged in the water and the container has a sufficient amount of water therein to keep the bait, such as minnows, alive for a predetermined length of time. The container being of glass, the minnows are, of course, clearly visible to the larger fish who, in striking at the minnows, contact with the sides of the jar and through their own momentum, are carried into the cage past the doors which immediately close after them by the action of the springs 8. It will thus be seen that I have provided a trap which needs no attention whatever, except the replacement of the bait in the bait container. It will also be understood that the cage may be made any suitable size or shape to suit the conditions desired.

What is claimed is:—

A fish trap comprising a cage consisting of an imperforate rectangular bottom plate, a wire frame secured thereto and having the central portion of one longitudinal edge extending horizontally inwardly toward the other longitudinal edge in a V-shape, uprights connected with said bottom plate and with said first named longitudinal edge at the ends of the arms of the V, wire screen secured to said frame and forming the top, end, back and front walls, the terminal edges of the screen on the front wall being secured to said uprights, a spring clip secured to said frame at the vertex of said V shaped portion, a vertically disposed bait container resting on said bottom plate and engaged within said clip, rectangular framed screen covered doors disposed vertically between said bottom plate and the arms of said V portion and abutting against the rear sides of said container when in their closed positions and springs coiled around and having their ends secured to said uprights and the adjacent frame members of said doors for urging said doors outwardly.

In testimony whereof I affix my signature in presence of two witnesses.

JEFFERSON D. LANGDALE.

Witnesses:
R. S. AIKIN,
J. J. LANGDALE.

Copies of this patent may be obtained for five cents each, by addressing the "Commissioner of Patents, Washington, D. C."